Dec. 17, 1963

C. J. MUNDO, JR 3,114,267

DOUBLY INTEGRATING ACCELEROMETER

Filed Oct. 20, 1958

INVENTOR.
CHARLES J. MUNDO, JR.

BY Raymond A. Paquin

ATTORNEY.

3,114,267
DOUBLY INTEGRATING ACCELEROMETER
Charles J. Mundo, Jr., Laurel Hollow, N.Y., assignor to American Bosch Arma Corporation, a corporation of New York
Filed Oct. 20, 1958, Ser. No. 768,243
2 Claims. (Cl. 73—490)

The present invention relates to motion indicators and has particular reference to accelerometers of the doubly integrating type.

Accelerometers may be classified as simple accelerometers such as pendulums for measuring acceleration, singly integrating types for displaying velocity, and doubly integrating types for indicating distance traveled.

The present invention provides a viscous restraint between the inertial element and the reference frame and a frequency pickoff to record the positional displacement. The first integration is inherently accomplished by the viscous restraint, the second by an accumulation of the frequency cycles.

In a particular exemplary embodiment, an inertial mass is contained in a fluid filled, axially rotating casing, which provides both radial centering of the inertial mass and viscous constraint between the inertial mass and the casing. A pair of capacitive pickoffs, oppositely responsive to the position of the mass with respect to the casing are adapted to control the output frequency of a pair of oscillators to provide two signals whose frequencies are indicative of the mass position. The number of cycles accumulated from the difference of the frequencies during the period of measurement is representative of the distance traveled during the period of measurement.

For a more complete understanding of this invention, reference may be had to the accompanying diagrams in which.

Figure 1:
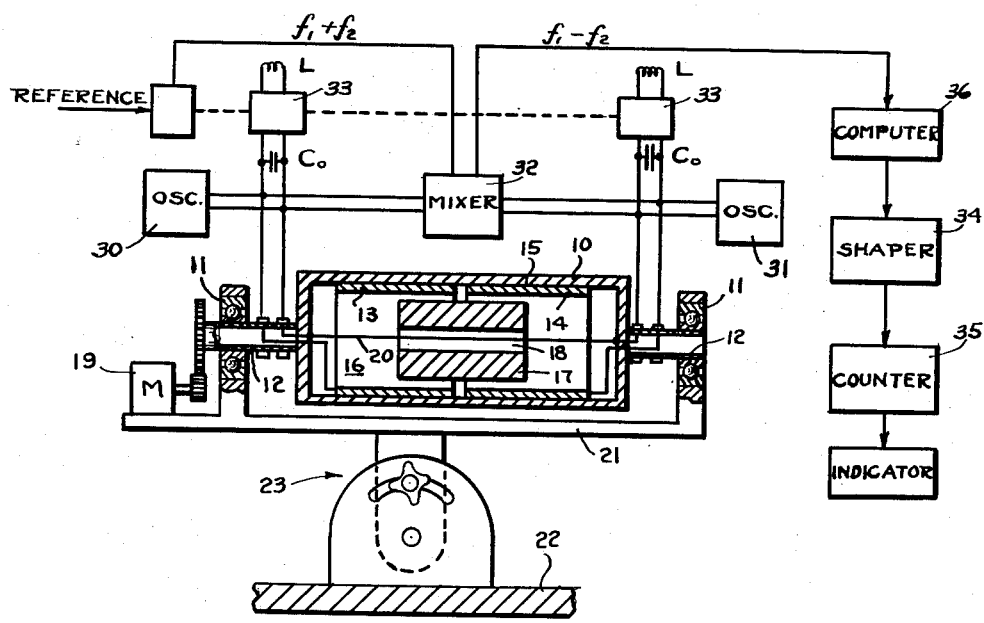
FIG. 1 illustrates a preferred embodiment of this invention.

The preferred embodiment shown in partial cross section in FIG. 1 has a cylindrical casing 10 supported for rotation in bearings 11 by the shafts 12. A pair of conducting surfaces 13, 14 on the inner and cylindrical surface of casing 10 are electrically insulated from each other, and from casing 10, by an insulating layer 15, if necessary. The casing 10 is partly filled with a viscous damping fluid 16.

A cylindrical float or bob 17 having an axial hole 18 therethrough is radially centered in the casing 10 by the centrifugal force of fluid 16, as the casing 10 is rotated by the motor 19.

An electrical conductor 20 is longitudinally disposed along the central axis of the casing 10, and passes through the hole 18 of float 17. There is sufficient clearance between the float 17 and both the surfaces 13, 14 and conductor 20 so that float 17 is able to move longitudinally within casing 10 without contacting either the conducting surface or conductor 20.

The motor 19 and bearings 11 are mounted on a platform 21 which is supported on the vehicle framework 22 by an adjustable support 23 such that the platform 21 can be rotated about an axis perpendicular to the axis of cylinder 10. This adjustment is utilized to center the float 17 longitudinally between the surfaces 13, 14 by tilting the cylinder 10 out of the horizontal in the direction which permits the float 17 to travel toward the center. When the float reaches the central position, the platform 21 is returned to the horizontal position. It is understood that during this adjustment the motor 19 is driving casing 10 to keep the float 17 radially centered in the casing 10.

The capacitance between conductor 20 and surface 13 changes in one direction and the capacitance between conductor 20 and surface 14 changes in the opposite direction upon motion of the float 17 away from its centrally located position. The float 17 changes the dielectric constant between the conductor 20 and the surface 13, 14 whence the value of the capacitance is dependent upon the length of the float within the cylindrical surfaces 13, 14, and the change of capacitance is proportioned to the displacement of float 17.

The capacitance between surface 13 and conductor 20 is adapted to control the frequency of one oscillator 30, while the capacitance between surface 14 and conductor 20 is adapted to control the frequency of another oscillator 31. The frequency of each of the oscillators 30, 31, therefore, is indicative of the position of float 17 with respect to the surfaces 13, 14. The frequency difference is then indicative of the position of the float 17 from the position midway between the surfaces 13, 14.

Figure 2:
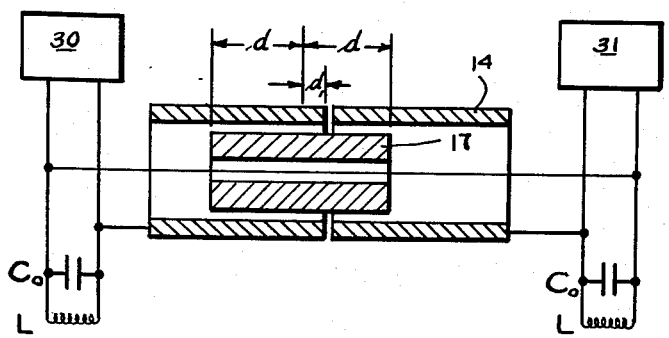
FIG. 2 shows a portion of FIG. 1.

Referring now to FIG. 2 of the drawings, the terminals of oscillator 30 are connected across the fixed capacitor $C_0$ and the fixed inductance L, and also the surface 13 and wire 20 across which the variable capacitance occurs. It will be seen then that the resonant frequency of oscillator 30 can be expressed as $$f_1 = \frac{1}{2\pi\sqrt{L(C_0 + kd + Kd_1)}} \quad (1)$$

where:

L is the value of the fixed inductance
$C_0$ is the value of the fixed capacitor
$kd$ is the value of the variable capacitor with the float 17 at its central position
$Kd_1$ is the change in capacitance due to a displacement of float 17 through a distance $d_1$ For ease of analysis, Equation 1 can be rewritten as $$f_1 = \frac{1}{2\pi\sqrt{LK(D+d_1)}} \quad (1a)$$

where $$D = \left[\frac{C_0 + kd}{K}\right]$$

Similarly, the frequency of oscillator 31 is expressed as $$f_2 = \frac{1}{2\pi\sqrt{LK(D-d_1)}} \quad (2)$$

The difference of the frequencies squared is, therefore, $$f_1^2 - f_2^2 = \left[\frac{1}{2\pi\sqrt{LK(D+d_1)}}\right]^2 - \left[\frac{1}{2\pi\sqrt{LK(D-d_1)}}\right]^2$$

which can be reduced algebraically to $$f_1^2 - f_2^2 = (f_1 - f_2)(f_1 + f_2) = \frac{-d_1}{2\pi^2 LKD^2}\left(\frac{1}{1-\left(\frac{d_1}{D}\right)^2}\right) \quad (3)$$

The sum frequency is:

$$f_1 + f_2 = \frac{1}{2\pi\sqrt{LKD}}\left[\frac{1}{\sqrt{1+\frac{d_1}{D}}} + \frac{1}{\sqrt{1-\frac{d_1}{D}}}\right] \quad (4)$$

Substituting (4) into (3), and reducing, $$f_1 - f_2 = \frac{-d_1}{D\pi\sqrt{LKD}}\left\{\frac{1}{\sqrt{1-\left(\frac{d_1}{D}\right)^2}\left[\sqrt{1-\frac{d_1}{D}} + \sqrt{1+\frac{d_1}{D}}\right]}\right\}$$

and, by ignoring higher powers of $(d_1/D)$, $$f_1 - f_2 = \frac{-d_1}{D\pi\sqrt{LKD}}\left\{\frac{1}{2-\frac{5}{4}\left(\frac{d_1}{D}\right)^2}\right\} \quad (5)$$

If D is made large compared to $d_1$, as by having a large external capacitor for example, it will be seen that the Equation 7 is essentially linear since the contribution of the squared term in the denominator is small. Thus, $f_1-f_2$ can be made substantially proportional to $d_1$ by appropriate choice and design.

Referring again to Equation 3 it will be seen that if $(f_1+f_2)$ is held constant by varying the external inductance L for example, Equation 3 can be written as $$f_1-f_2 = -K^1 d_1 \left(\frac{1}{1-\left(\frac{d_1}{D}\right)^2}\right) \quad (6)$$

where $$K^1 = \frac{1}{2\pi^2 L K D^2} \frac{1}{f_1+f_2}$$

If $d_1$ is small, compared to D, the relationship is essentially linear. Although L is adjusted to keep $(f_1+f_2)$ constant the effect on $K^1$ is such that the linearity of Equation 6 is not impaired.

It can be assumed, therefore, for the purposes of explanation, that $$f_1-f_2 = A d_1 \quad (7)$$

where A is a constant of proportionality. For extreme accuracy, corrections would have to be made for the non-linear response.

When the forces on the float 17 are in equilibrium, the displacement of the float 17 may be determined from the equation $$Mp^2 x = -Fp(x-x_r)$$

where:

M is the mass of the bob
F is the viscous damping coefficient
$(x-x_r)$ is the displacement of the bob 17 relative to frame $10 = d_1$
$x$ is the displacement of accelerometer from starting point.
$x_r$ is the displacement of bob from starting point
$p$ is a differential operator $d/dt$ Then $$\left(\frac{M}{F}p+1\right)x = X_r$$

and $$d_1 = x - x_r = -\frac{\frac{M}{F}px_r}{\left(\frac{M}{F}p+1\right)}$$

Thus, the displacement $d$ is proportional to the velocity of the bob 17 which is substantially the velocity of the casing 10. For satisfactory response the time constant $$\frac{M}{F}p$$

must be on the order of a few milliseconds or less.

The longitudinal position of the float 17 is thus representative of the velocity of the craft carrying the accelerometer by virtue of the viscous constraint coupling the float 17 to casing 10, which constraint is provided by the viscous fluid 16.

As seen from Equation 7 the frequency difference is indicative of the displacement of the float 17. A count of cycles of frequency difference over a given time interval is the integral of the frequency difference and is, therefore, indicative of the time integral of the displacement of float 17. Since the displacement of the float 17 is a function of the velocity of the craft, the count of frequency difference cycles is the time integral of velocity, or the distance traveled by the craft.

To this end the frequencies $f_1$ and $f_2$ from oscillators 30 and 31 are mixed in a mixer 32 to obtain the frequencies $f_1+f_2$ and $f_1-f_2$. The $f_1+f_2$ frequency may be adapted to control the inductance L to keep the frequency sum constant. For example, the coil L may be connected across the capacitor $C_0$ through a vario-coupler 33 and the vario-coupler adjusted so as ot keep the frequency sum constant. This may be accomplished with apparatus such as described in copending patent application Serial No. 611,042, filed September 20, 1956.

The difference frequency is fed to a pulse shaper 34, familiar in digital computer circuitry, which produces an output pulse for each cycle of difference frequency per unit of time. The output of the pulse shaper is applied to a pulse counter 35 which accumulates a total count of the number of cycles difference. This total, being an integration of the difference frequency, is therefore an integration of the velocity of the craft and an indication of the distance traveled by the craft.

A computer 36 may be interposed between mixer 32 and shaper 34 for solution of Equations 5 or 6 in the event that Equation 7 is not sufficiently accurate. A suitably calibrated indicator 37 is connected to the output of counter 35.

It must be recognized that certain precautions must be observed in the construction of the instrument. For example, to provide constant viscuousity for fluid 16 a temperature controlled environment may have to be used. Trimming devices may be required to assure that the frequencies of the two oscillators at zero acceleration are the same.

I claim:
1. In a device of the character described, a casing, a pair of conducting surfaces in said casing, a mass, viscous constraint means between said mass and said casing, an electrical conductor in said casing, said mass being positioned between said conductor and said conducting surfaces to change the dielectric constant therebetween upon motion of said mass, oscillator means connected between said conductor and one of said surfaces, second oscillator means connected between said conductor and the other of said surfaces, said oscillators producing a pair of frequencies reacting oppositely to displacement of said mass, means for determining the difference frequency of said oscillator frequencies, and means for counting the cycles in said difference frequency.

2. In a device of the character described, a casing, a mass, viscous constraint means between said mass and said casing, a pair of impedance means on said casing each affected by that portion of said mass adjacent thereto, oscillator means connected to one of said impedance means, second oscillator means connected to the other of said impedance means, said oscillators producing a pair of signals having frequencies oppositely responsive to displacement of said mass, means for producing a signal having a frequency equal to the difference frequency of said oscillator signals and means for counting the cycles in said difference frequency signal.

References Cited in the file of this patent

UNITED STATES PATENTS

| | | |
|---|---|---|
| 2,293,234 | Winter | Aug. 18, 1942 |
| 2,371,626 | Kecskemeti | Mar. 20, 1945 |
| 2,411,401 | Welch | Nov. 19, 1946 |
| 2,591,921 | Cosgriff | Apr. 8, 1952 |
| 2,613,071 | Hansel | Oct. 7, 1952 |
| 2,697,594 | Stanton | Dec. 21, 1954 |
| 2,726,074 | Ketchledge | Dec. 6, 1955 |
| 2,728,868 | Peterson | Dec. 27, 1955 |
| 2,777,953 | Tollefson | Jan. 15, 1957 |
| 2,840,366 | Wing | June 24, 1958 |
| 2,899,190 | Driver | Aug. 11, 1959 |

FOREIGN PATENTS

| | | |
|---|---|---|
| 715,750 | Great Britain | Sept. 22, 1954 |
| 789,611 | Great Britain | Jan. 22, 1958 |